(12) United States Patent
Peters et al.

(10) Patent No.: US 7,192,218 B2
(45) Date of Patent: Mar. 20, 2007

(54) DIRECT RECHARGE INJECTION OF UNDERGROUND WATER RESERVOIRS

(75) Inventors: Stanley R. Peters, Castle Rock, CO (US); Donald O. Summers, Morrison, CO (US)

(73) Assignee: PS Systems Inc., Lakewood, CO (US)

( * ) Notice: Subject to any disclaimer, the term of this patent is extended or adjusted under 35 U.S.C. 154(b) by 0 days.

(21) Appl. No.: 11/064,548

(22) Filed: Feb. 23, 2005

(65) Prior Publication Data

US 2005/0186030 A1    Aug. 25, 2005

Related U.S. Application Data

(60) Provisional application No. 60/547,496, filed on Feb. 24, 2004.

(51) Int. Cl.
*B65G 5/00* (2006.01)

(52) U.S. Cl. ...................... 405/53; 137/236.1
(58) Field of Classification Search ............ 405/52, 405/53, 56, 57, 59; 137/236.1
See application file for complete search history.

(56) References Cited

U.S. PATENT DOCUMENTS

| | | |
|---|---|---|
| 1,159,055 A | 11/1915 | Lowe, Sr. |
| 1,173,208 A | 2/1916 | Byram |
| 1,815,722 A | 7/1931 | Lydon |
| 3,354,656 A | 11/1967 | Fahnestock |
| 3,645,101 A | 2/1972 | Sherard |
| 3,800,544 A | 4/1974 | Nakanishi |
| 4,180,348 A | 12/1979 | Taylor |
| 4,222,685 A | 9/1980 | Jefferson |
| 4,276,164 A | 6/1981 | Martone et al. |
| 4,326,818 A | 4/1982 | Willis |
| 4,344,722 A | 8/1982 | Blais |
| 4,457,646 A | 7/1984 | Laesch |
| 4,501,788 A | 2/1985 | Clem |
| 4,637,462 A | 1/1987 | Grable |
| 4,651,824 A | 3/1987 | Gradle |
| 4,696,607 A | 9/1987 | Ressi di Cervia |
| 4,902,167 A | 2/1990 | Shelton |
| 4,919,568 A | 4/1990 | Hurley |
| 4,986,696 A | 1/1991 | Pera |
| 4,988,235 A | 1/1991 | Hurley |
| 5,080,528 A | 1/1992 | Ressi di Cervio |
| 5,178,491 A | 1/1993 | Graves et al. |
| 5,228,802 A | 7/1993 | Kuwabara et al. |
| 5,249,887 A | 10/1993 | Phillips |

(Continued)

OTHER PUBLICATIONS

U.S. Appl. No. 10/704,347 filed Nov. 7, 2003, confirmation No. 3059 titled "Method of Operating a Water Storage Reservoir Having Porosity Storage".

*Primary Examiner*—Sunil Singh
(74) *Attorney, Agent, or Firm*—Merchant & Gould (57) ABSTRACT

An underground porosity water storage reservoir minimizes the impacts on surface uses of the reservoir site. Furthermore, a method of operating an underground porosity storage reservoir minimizes damage to the reservoir due to injecting sediment-laden water or water that is chemically incompatible with the porous material in the underground reservoir. The underground porosity water storage reservoir reduces temperature impacts on surface waters due to the discharge of stored water. A method of using the porosity storage reservoir to minimize adverse temperature impacts when discharging water to a surface body is disclosed.

19 Claims, 6 Drawing Sheets

U.S. PATENT DOCUMENTS

| | | |
|---|---|---|
| 5,342,144 A | 8/1994 | McCarthy |
| 5,360,290 A | 11/1994 | Yamada et al. |
| 5,458,436 A | 10/1995 | Plowman et al. |
| 5,468,097 A | 11/1995 | Bernhardt |
| 5,672,028 A | 9/1997 | Mechta |
| 5,758,991 A | 6/1998 | Shiosaka |
| 5,827,010 A | 10/1998 | Hassett |
| 5,885,026 A | 3/1999 | Hwang |
| 5,965,031 A * | 10/1999 | Kitz et al. .................. 210/696 |
| 6,000,880 A | 12/1999 | Halus |
| 6,041,738 A | 3/2000 | Hemauer et al. |
| 6,095,718 A | 8/2000 | Bohnhoff |
| 6,102,618 A | 8/2000 | Takada et al. |
| 6,116,816 A | 9/2000 | Suthersan et al. |
| 6,120,210 A | 9/2000 | Hsu |
| 6,139,225 A | 10/2000 | Koike et al. |
| 6,280,118 B1 | 8/2001 | Suthersan et al. |
| 6,375,907 B1 * | 4/2002 | Gallup ........................ 423/571 |
| 6,840,710 B2 | 1/2005 | Peters et al. |
| 2002/0172559 A1 * | 11/2002 | Peters et al. .................. 405/52 |

* cited by examiner

DIRECT RECHARGE INJECTION OF UNDERGROUND WATER RESERVOIRS

RELATED APPLICATIONS

The application claims priority from U.S. Provisional Application No. 60/547,496, filed Feb. 24, 2004, which is hereby incorporated herein by reference.

FIELD OF THE INVENTION

This application relates generally to a method of operating a water storage facility and more particularly to a method of operating a water storage facility that includes one or more underground alluvial water storage reservoirs.

BACKGROUND OF THE INVENTION

It is becoming increasingly difficult, both in terms of cost and site availability, to construct conventional open reservoirs for the storage of water. Such reservoirs typically require the construction of a dam across a river, thereby flooding vast expanses of land upstream of the dam while severely curtailing the flow of water downstream from the dam. In light of the increasing value of water and the complexities of the various water laws across different jurisdictions, it is becoming prohibitively difficult to form an open reservoir in this manner.

In addition, open reservoirs have several disadvantages. One disadvantage is that they preempt any current or future use of the land other than to store water. That is, as additional land surface is devoted to the storage of water in open reservoirs, that same land surface is unavailable for alternative uses such as farming or open space.

A further disadvantage of storing water in open reservoirs is the high degree of evaporative losses experienced by such reservoirs due to the relatively large air/water interface. Specifically, in arid climates (such as those found in the Western United States), open reservoirs are subject to extremely large evaporative losses. Indeed, such evaporative losses are typically greatest where water is needed most.

A further unfortunate disadvantage to open reservoirs is that the reservoirs are highly susceptible to contamination. While previous contamination concerns have been limited to accidental chemical spills, petroleum leaks, polluted surface-water runoff, and the like, a more immediate threat is that of intentional contamination as part of a terrorist act.

Yet another disadvantage relates to detrimental temperature effects caused by surface water storage. For example, a surface water storage reservoir may contain water that is too warm to support indigenous species of fish and other animals. Discharge of the warm water from the reservoir could then damage the downstream fish populations.

Underground porosity reservoirs, such as those described in U.S. Pat. No. 6,840,710 to Peters et al., titled UNDERGROUND ALLUVIAL WATER STORAGE RESERVOIR AND METHOD, have been posited as an alternative to open reservoirs. Underground porosity reservoirs include a volume of porous material, such as natural alluvium, bounded by substantially impermeable walls to create an underground vessel capable of storing water. Underground reservoirs potentially can be used without the loss of surface use of the site. Underground reservoirs are also not subject to evaporation losses and are less susceptible to intentional and accidental contamination.

However, underground porosity water reservoirs also have drawbacks when used for water storage. First, typical water diversion techniques suitable for filling open reservoirs, such as direct pumping from a surface water body or the use of surface diversion ditches, reduce the potential benefits of underground reservoirs. The use of existing diversion ditches directly impacts surface uses near a reservoir site and therefore reduce one major benefit of underground reservoirs. Additionally, surface ditches, which are typically unlined because of cost, increase the passive loss of water due to evaporation and infiltration, thus reducing another major benefit of underground reservoirs. Furthermore, the diversion techniques mentioned above typically increase the sediment load in the water, which, as discussed below, is another factor that makes typical diversion techniques undesirable for use with underground reservoirs.

Second, unlike with open reservoirs, the sediment load of the water to be stored in an underground reservoir is very important. If water injected into an underground reservoir has a high sediment load, the alluvium surrounding the injection points may be clogged, reducing the effectiveness of the underground reservoir and reducing the storage capacity of the reservoir. Thus, care must be taken to monitor and maintain the physical quality of the water to be stored in an underground reservoir. Sediment control with open reservoirs, when performed at all, is typically achieved using a settling pond near the open reservoir. However, settling ponds represent a significant impact on surface use of the reservoir site and are undesirable for use in sites where impacts on surface uses are to be minimized.

Third, not all alluvium is chemically inert, and thus water injected into an underground reservoir may contain dissolved chemicals that react with the alluvium or porous material that provides the porosity of the underground reservoir. For example, a basic alluvium (e.g., an alluvium high in calcium carbonate) will chemically react with water that is acidic. This reaction could cause a precipitate to form that fouls the underground reservoir or changes the character of the water thereby rendering the stored water useless for its intended purpose.

In order to cost-effectively operate an underground porosity reservoir and minimize impacts to the surface uses, new methods of operation and management are required. The present invention provides a solution to these and other problems, and offers other advantages over the prior art.

SUMMARY OF THE INVENTION

Against this backdrop the present invention has been developed. The present invention includes a subsurface water storage system for receiving and storing substantially sediment-free water from a surface water body containing sediment-laden water. The subsurface water storage system includes an underground porosity storage reservoir storing water that includes an underground vessel formed by one or more substantially water-impermeable, man-made barriers and an aquiclude. The vessel defining a volume such that the volume is substantially hydrologically separate from an environment exterior to the volume. The system also includes at least one aquifer well coupled to the underground reservoir by piping—each well being located in an aquifer that is hydrologically connected to the surface water body and having a wellhead. The system further includes a pump for pumping water from the aquifer into the underground reservoir via the aquifer well. The water obtained from the well is substantially free of sediments found in the surface water body, because it has been naturally filtered by the alluvium surrounding the well.

Another aspect of the present invention is a method of storing water in an underground reservoir filled with a porous material. The underground storage reservoir includes an underground vessel formed by one or more substantially water-impermeable, man-made barriers and an aquiclude that define a volume that is substantially hydrologically separate from the surrounding environment. The method includes accessing a first subsurface body of water outside of the underground reservoir and determining if the first body of water is compatible with the material in the underground reservoir. If the first body of subsurface water is determined to be compatible, water is extracted from the first body of water and injecting the extracted water into the underground reservoir.

Yet another aspect of the present inventions is a method for reducing temperature impacts to a surface water body caused by the discharge of water to the surface water body having a first temperature. The method includes receiving water to be discharged to the surface water body that has a second temperature different from the first temperature of the surface water body. The water is stored in an underground porosity storage reservoir that includes one or more substantially water-impermeable, man-made barriers and an aquiclude defining a volume of alluvial deposits such that the volume is substantially hydrologically separate from an aquifer external to the reservoir. The temperature of the water in the underground storage reservoir is monitored at a point in the underground reservoir and, when the water is within a predetermined temperature range, the water is transferred from the underground porosity storage reservoir to an aquifer that is hydrologically connected to the surface water body, thereby effectively discharging the water to the surface water body. The predetermined temperature ranged is determined based on the temperature of the water in the aquifer that is hydrologically connected to the surface water body and not on the first temperature of the surface water body.

These and various other features as well as advantages which characterize the present invention will be apparent from a reading of the following detailed description and a review of the associated drawings.

DETAILED DESCRIPTION

Embodiments of the present invention include underground porosity reservoir systems and methods that minimize impact to surface uses while also improving the quality of water drawn from surface water bodies for storage in the underground reservoirs. Embodiments also include underground porosity reservoir systems and methods that reduce the impact on surface water bodies due to the discharge of stored water.

Figure 1:
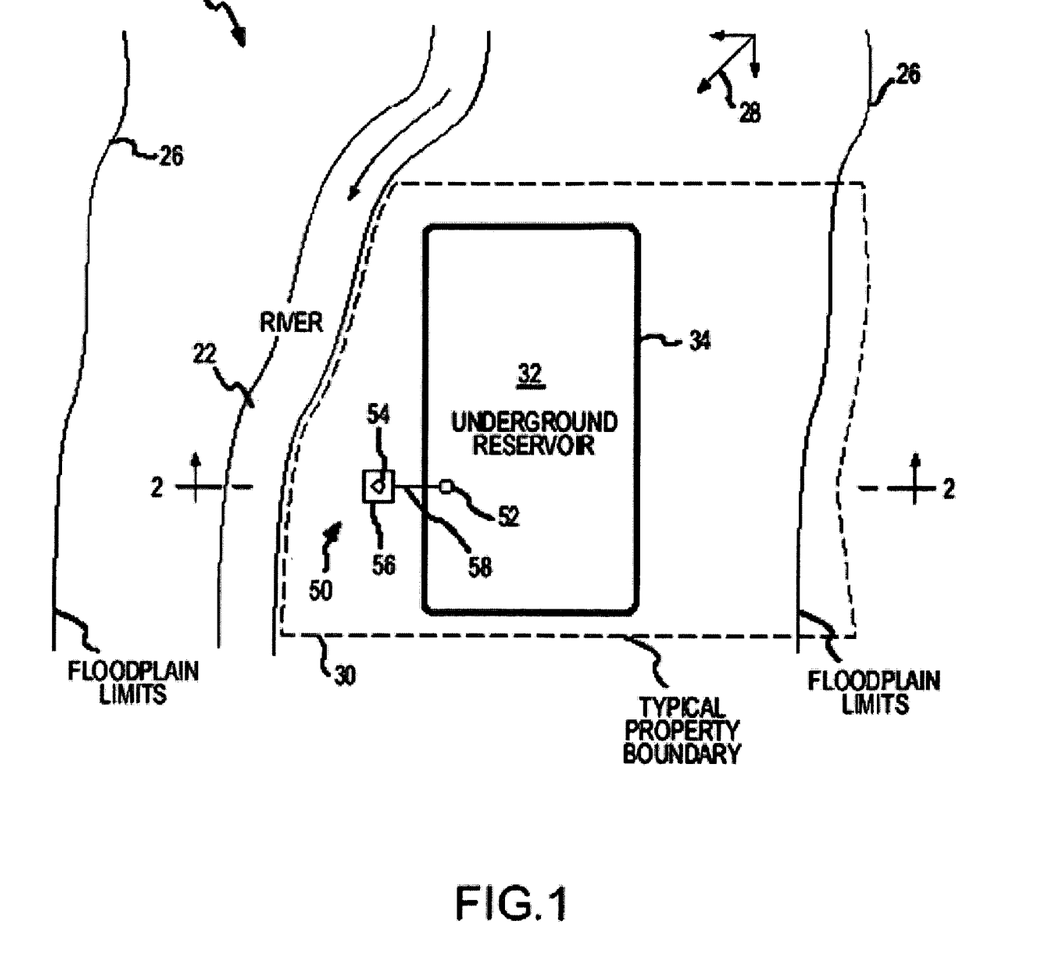
FIG. 1 is a plan view of a typical river basin illustrating a property boundary and a perimeter of an underground water reservoir for use with an embodiment of the present invention.
Figure 2:
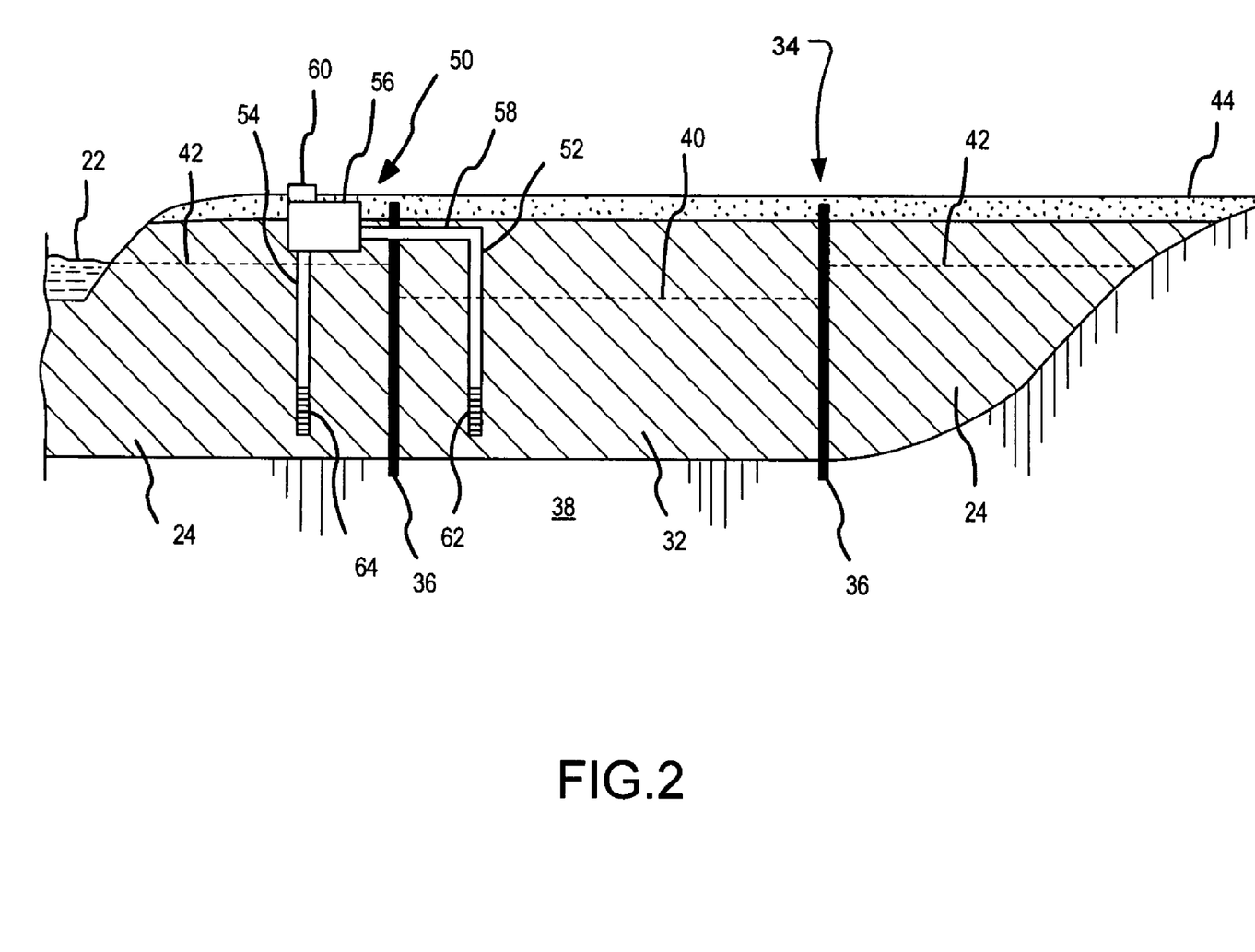
FIG. 2 is a section view of the river basin taken substantially along the line 2—2 in FIG. 1 illustrating the underground water reservoir and transfer system.

FIGS. 1 and 2 illustrate an exemplary underground reservoir system in accordance with the present invention. FIG. 1 illustrates a plan view of an exemplary river system or basin 20 comprising a riverbed 22 that flows along the top of alluvial deposits 24 (FIG. 2), e.g., sand and gravel, formed within the boundary 26 of a floodplain that extends to either side of the current riverbed 22. An arrow 28 in FIG. 1 illustrates a direction of flow of the groundwater through the alluvial deposits 24. A dashed line 30 further illustrates a typical property line of a parcel of land that abuts the river 22. An underground reservoir 32 is preferably formed with a regular geometric boundary 34, such as the rectangular boundary 34 shown in FIG. 1, so that the entire boundary 34 is contained within the property line 30. The design, construction and technical aspects of underground reservoirs are the subject of U.S. Pat. No. 6,840,710, titled UNDERGROUND ALLUVIAL WATER STORAGE RESERVOIR AND METHOD, filed on May 15, 2002 and issued on Jan. 11, 2005, which is incorporated herein by reference.

FIG. 2 illustrates a section view of the river basin 20, including the riverbed 22 itself and the lateral and vertical limits of the reservoir 32. The underground reservoir 32 is created by bounding a volume of alluvial deposits with man-made sidewalls 36. The walls 36 are substantially water impermeable and are preferably vertical in orientation. In the embodiment shown, the walls 36 are keyed into bedrock 38 or a similar aquiclude that extends below the floodplain boundary 26. Note, that in the absence of a suitable natural aquiclude 38, an alternative embodiment uses a man-made aquiclude instead, albeit at a substantially increased cost. In order to minimize the surface impacts of the reservoir 32, the sidewalls 36 preferably do not extend to the ground surface 44.

The underground reservoir 32 encloses a volume of natural alluvium. The water storage provided by the reservoir is in the form of porosity storage within the pores of the natural alluvium. Depending on the alluvial material, the usable water storage volume may range from 10% to 40% of the total enclosed volume of the reservoir 32. In an alternative embodiment, a different material, such as imported sand, gravel or recycled concrete, is used instead of natural alluvium.

The sidewalls 36 and aquiclude 38 may be considered to form an open-topped, underground vessel capable of holding water and keeping it hydrologically separate from the natural aquifer 24. This is illustrated by the different water levels shown within the natural aquifer 24 and within the underground reservoir 32 as denoted by dashed lines 42 and 40, respectively. In practice, the vessel is not perfectly hydrologically separate, and is referred to as only substantially hydrologically separate from the natural aquifer 24 of the river basin 20, because during construction it is normally not possible to make a perfectly water tight seal between the side walls 36 and the aquiclude 38. Furthermore, modern techniques of making sidewalls 36 in-situ in natural environments, such as via slurry wall construction, do not always result in a perfectly water-impervious wall. While such imperfections may be accounted for, methods of operating an underground reservoir that take into account these imperfections are beyond the scope of this specification, and are instead included in co-pending U.S. patent application Ser. No. 10/704,347, titled METHOD OF OPERATING A WATER STORAGE RESERVOIR HAVING POROSITY STORAGE, filed Nov. 7, 2003, which is incorporated herein by reference.

Embodiments of the present invention include underground reservoirs 32 provided with subsurface water transfer systems that minimize impacts to surface uses while also improving the water quality of water drawn from surface water bodies (such as the river 22) for storage in the underground reservoirs 32. FIGS. 1 and 2 show an exemplary embodiment of an underground reservoir 32 provided with a water transfer system 50 for transferring water between the underground reservoir 32 and the river system 20. In the exemplary embodiment, the transfer system 50 includes an extraction/injection well 52 within the underground reservoir 32 and a well 54 outside the boundary 34 of the underground reservoir 32.

An extraction/injection well (hereinafter a "well") is a hole or shaft sunk into the earth, usually vertically, allowing access to subsurface water and, in a preferred embodiment, includes a section of PVC or metal pipe extending substantially vertically down to a depth below surface. This section of pipe is referred to as the well casing and is preferably strong enough to resist the compressive forces of the material around the well and keep the well hole open. At some point usually at or near the bottom of the well, the well casing is slotted or perforated to permit water to enter the well casing via hydrostatic pressure. Depending on the extraction technique, the well casing may be unsuitable for actual extraction—often because the well casing is too large or because the slotted section of pipe extends above the water level 40, 42. In these cases, a second section of pipe is typically provided inside the well casing for the actual extraction or injection of water. In a preferred embodiment, an external pump is coupled to the well to alternately extract water from or inject water into the well as necessary. In an alternative embodiment, a down hole pump may be used. Extraction/injection wells are well known in the art, and any suitable well design may be used with embodiments of the present invention. Furthermore, one skilled in the art will recognize that each well 52, 54 may be replaced with one or more well fields of multiple wells without departing from the teaching herein.

The transfer system 50 includes a first well 52 placed within the underground reservoir 32 and a second extraction/injection well 54 placed within the natural alluvium outside of the reservoir. The first well 52 in the reservoir 32 is used to both remove water from the reservoir 32 and inject water into the reservoir 32 at the well's screened interval 62, which in the embodiment shown is vertically positioned near the aquiclude 38. Preferably, wells that extract water from the reservoir 32 have screened intervals 62 located as near as possible to the aquiclude 38 in order to maximize the effective storage capacity of the reservoir 32. This preference does not apply, however, to wells used solely for injection of water. The second well 54 is hydrologically connected to the surface body, i.e., the river 22, as the well 54 extracts water and discharges to the aquifer 24 at that well's screened interval 64, which is preferably located at some depth that is consistently below the water level 40 of the aquifer 24.

In the embodiment shown, the transfer system 50 further includes an underground vault 56 that is connected to the reservoir well 52 and the external aquifer well 54. The reservoir well 52 is shown connected to the vault via a length of horizontal subsurface piping 58. Since the only access to the wells 52, 54 in FIG. 2 is via the vault 56, the vault 56 is said to contain the wellhead, i.e., the principal access point, of each well 52, 54. In the preferred embodiment, the vault 56 contains the piping, valving, and other equipment necessary to transfer water, in either direction, between the two wells 52, 54. In the preferred embodiment, the vault 56 also houses one or more pumps necessary to effectuate the transfer of water between the aquifer 24 and the reservoir 32. The vault 56 is preferably entirely subsurface and may be accessed by a manhole, a removable cover or other access point 60 as shown. Thus, in the preferred embodiment, the access point 60 is the only portion of the underground reservoir transfer system 50 that extends to the ground surface 44. In this way, the impacts on the surface uses of the site are minimized, while the quantity of porosity storage is not affected and, as will be discussed in greater detail below, the quality of water taken from the river system 20 is improved over that of traditional surface diversion techniques.

Alternative embodiments of the transfer system 50 are also contemplated. For example, in an embodiment each well 52, 54 may be provided with its own vault connected by subsurface piping between the vaults. In yet another embodiment, the wellheads of both wells are located within the vault, but one of the wells is drilled at an angle so that the well does not extract water from directly beneath the vault 56, thereby eliminating the need for any horizontal piping 58. In yet another embodiment, the vault may straddle a sidewall 36 and contain the wellhead for two vertical wells, one on each side of the sidewall 36. Other variations in well and subsurface vault design are also possible.

The embodiment of the underground reservoir 32 and transfer system 50 shown in FIGS. 1 and 2 also reduces fouling of the porosity storage material by preventing the introduction of chemically or physically incompatible water into the underground reservoir. As discussed above, introduction of incompatible water into an underground reservoir can result in unexpected problems, such as chemical precipitation, clogging with sediments and undesirable biological growth, which are not an issue in a typical open storage reservoir. The underground reservoir 32 prevents the above effects by receiving water from the aquifer 24 of the surface body 22, rather than directly from the surface body 22. Thus, the water from the aquifer 24 can be considered to have already been treated to a state that is compatible with the natural alluvium found within the underground reservoir 32. Any precipitation or sediment dropout that would have occurred if the surface water had been directly injected into reservoir 32 will have already occurred naturally (e.g., at the ground surface or on the riverbed) with no effect on the reservoir 32. Furthermore, no adverse biological activity will occur because the temperature of the injected water (and any biological activity naturally occurring in the aquifer will be compatible with the natural alluvium within the reservoir 32.

The embodiment of the underground reservoir 32 shown in FIG. 2 also reduces adverse impacts to the beneficial use of the ground surface. In the present embodiment, the side walls 36 do not extend to the surface 44 in order to reduce the amount of visual impart to surface users and allow for beneficial use of the surface 44 with minimal impact due to the underground reservoir 32 below. In an alternative embodiment, the side walls 36 may extend to the surface and take the form of surface features, such as sidewalks, service roads, tennis or basketball courts or walls, that are not identifiable as parts of an underground reservoir 32. The vault 56 then preferably remains underground or is visually secluded such that the access point 60 (which may be the vault itself) is the only part of the underground reservoir system that is visible at the surface. If other wells are necessary in order to achieve the extraction/injection rates necessary for optimal operation, these wells are provided with their own underground vaults or are otherwise connected to one or more central underground vaults.

In an alternative embodiment, the surface 44 may comprise a man-made covering (not shown) to the underground reservoir 32. This essentially makes the underground reservoir 32 an enclosed vessel that prevents the stored water from being impacted by surface water runoff. Such a covering could take the form of concrete tennis courts, basketball courts, parking lots or building foundations, among others.

Figure 6:
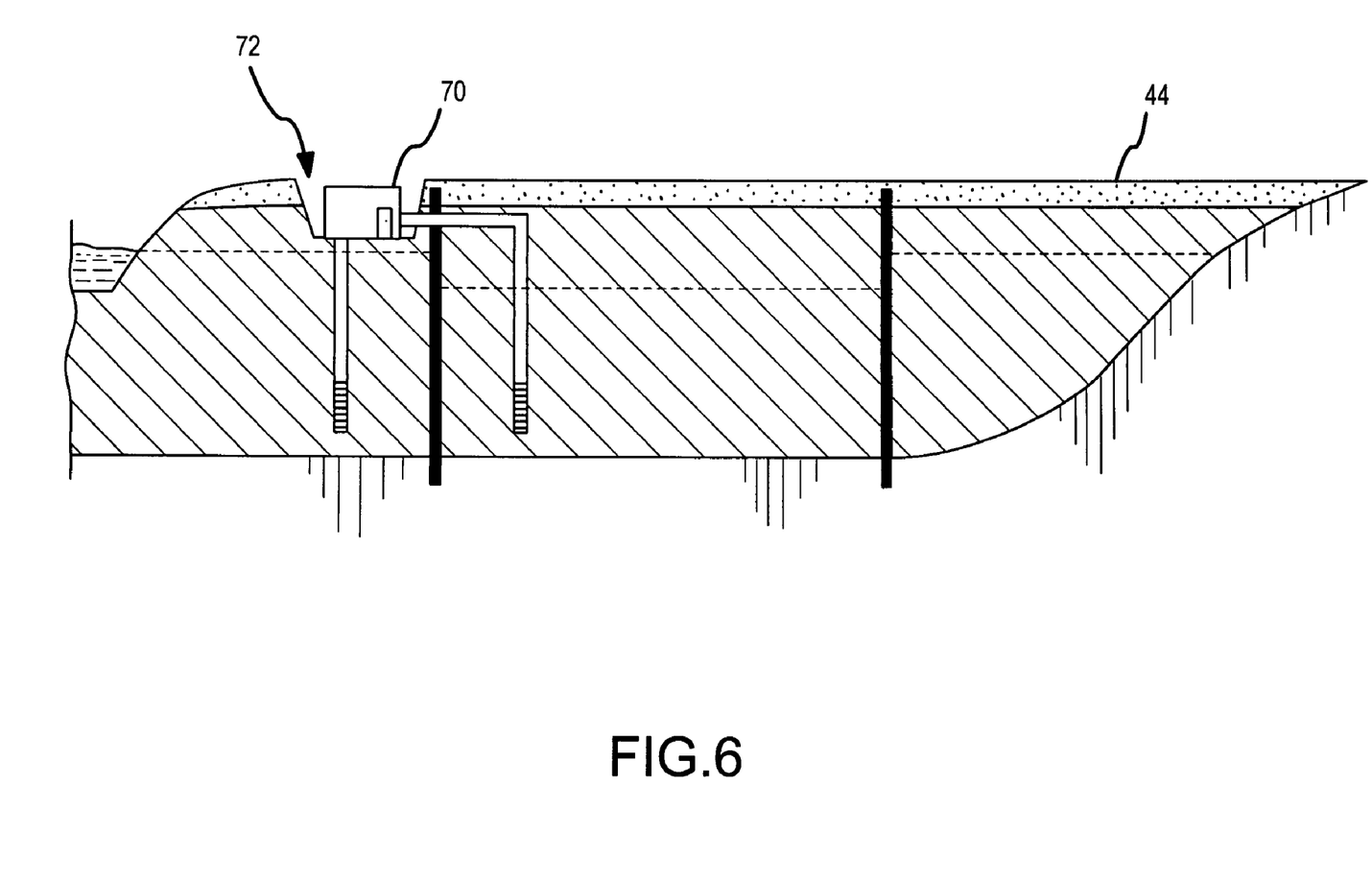
FIG. 6 illustrates an alternative embodiment of an underground reservoir and transfer system that eliminates confined space issues by replacing the vault with a surface building constructed below grade.

FIG. 6 illustrates yet another alternative embodiment, in which the wellhead may be in a building 70 instead of a vault. However, to limit the surface visibility, the building may be within an excavated area 72 so that the building 70, while above ground, is below the original ground surface 44. This alternative embodiment eliminates the issues associated with confined spaces and activities related to subsurface vaults while still reducing the visual impact of the reservoir at the surface.

Embodiments of the present invention have many advantages over traditional surface water storage and previously disclosed underground reservoirs. The underground reservoir 32 and subsurface transfer system 50 substantially eliminate surface impacts to the reservoir site, while providing protected water storage and efficient transfer of water into and out of the underground reservoir.

Embodiments of the present invention, such as the exemplary embodiment of the underground reservoir 32 and transfer system 50 shown in FIGS. 1 and 2, also are an improvement over underground reservoirs that utilize traditional surface diversion techniques and sediment control techniques, such as those disclosed in U.S. Pat. No. 6,840, 710. As discussed above, underground porosity reservoirs are detrimentally affected if injected with water having entrained sediments. Embodiments of the present invention address this by extracting water not from a surface body directly, but rather indirectly extracting the water from an aquifer hydrologically connected to the surface body, thereby using the natural aquifer as a source of pre-filtered water. For example, in the embodiment shown in FIGS. 1 and 2, the water extracted from the aquifer 24 of the river system 20 has been filtered by the river system's natural alluvium. Because water removed from the aquifer 24 is replaced by water from the river 22, the transfer system 50 constitutes an indirect means of transferring filtered water from the river 22 into the underground reservoir 32.

Embodiments of the present invention also include methods of indirectly extracting water from a surface body and storing the water in an underground reservoir that minimizes the chance of detrimental impacts to the underground reservoir due to water quality of the water to be stored. As described above, an underground porosity storage reservoir may be detrimentally impacted by injecting incompatible water into the underground reservoir. The water may be incompatible because of its sediment content or because of some chemical incompatibility with either the porous material or the water already in the underground reservoir. In a relatively simple system such as that shown in FIGS. 1 and 2, it can be assumed that any water taken from the aquifer 24, especially from a deep location near the aquiclude, is chemically compatible with the alluvium in the underground reservoir 32 because the alluvium is from the same alluvial deposit in the same river system 22, and because the wells 52, 54 are relatively close.

Figure 3:
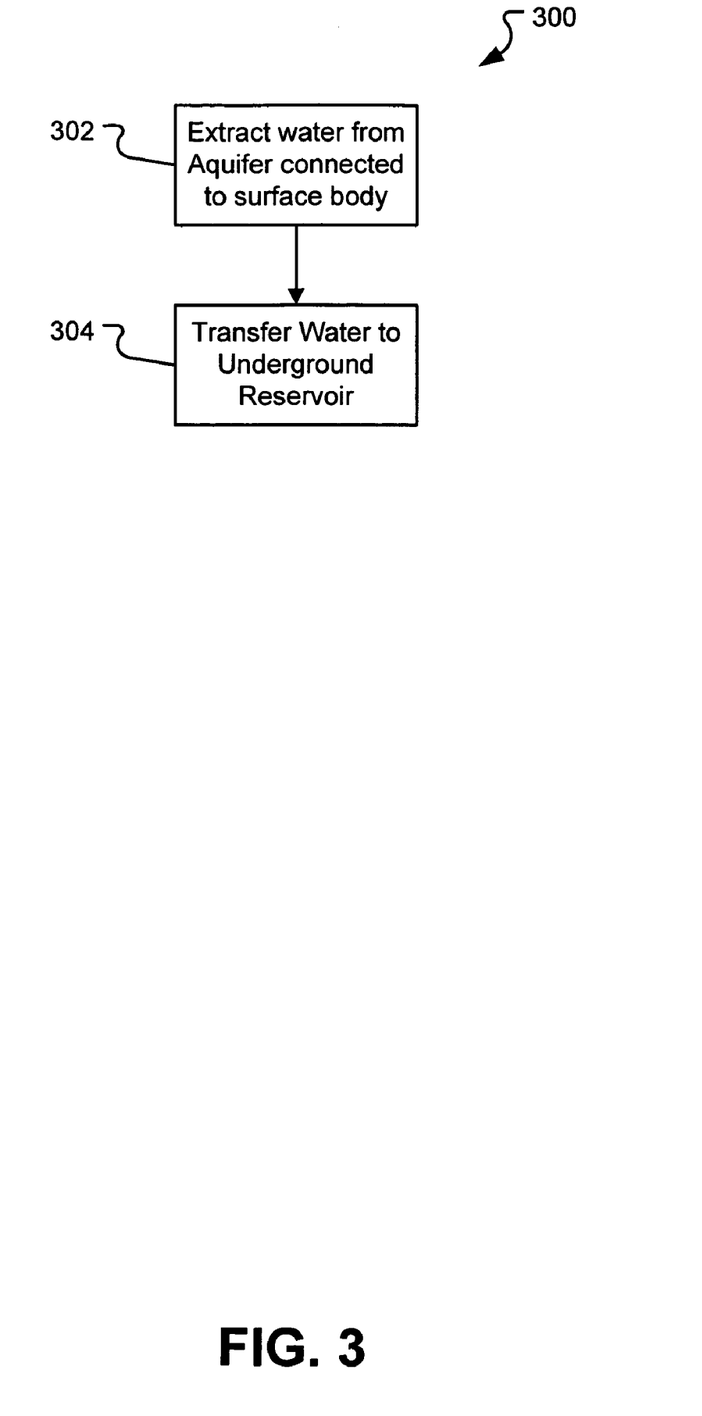
FIG. 3 illustrates an embodiment of a method for filling an underground reservoir from a surface body hydrologically connected to an aquifer.

FIG. 3 illustrates a relatively simple embodiment of a method 300 for filling an underground reservoir 32 from a surface body 22 hydrologically connected to an aquifer 24. The method 300 is suitable for use when the water in the aquifer 24 is known to be compatible with the underground reservoir. The embodiment of the transfer method 300 includes simply extracting the water from the aquifer 24 (at step 302) through the transfer system 50 and pumping it (at step 304) into the underground reservoir 32.

However, the method of FIG. 3 may have only limited application in the field because of the potential that the extracted water characteristics may change over time. A more conservative, and preferred, embodiment of a method for filling an underground reservoir from a surface body would provide for periodic or continuous monitoring of at least the turbidity (a measure of sediment load) of water to be injected into the underground reservoir and allow for subsequent treatment of the water, if necessary.

Figure 4:
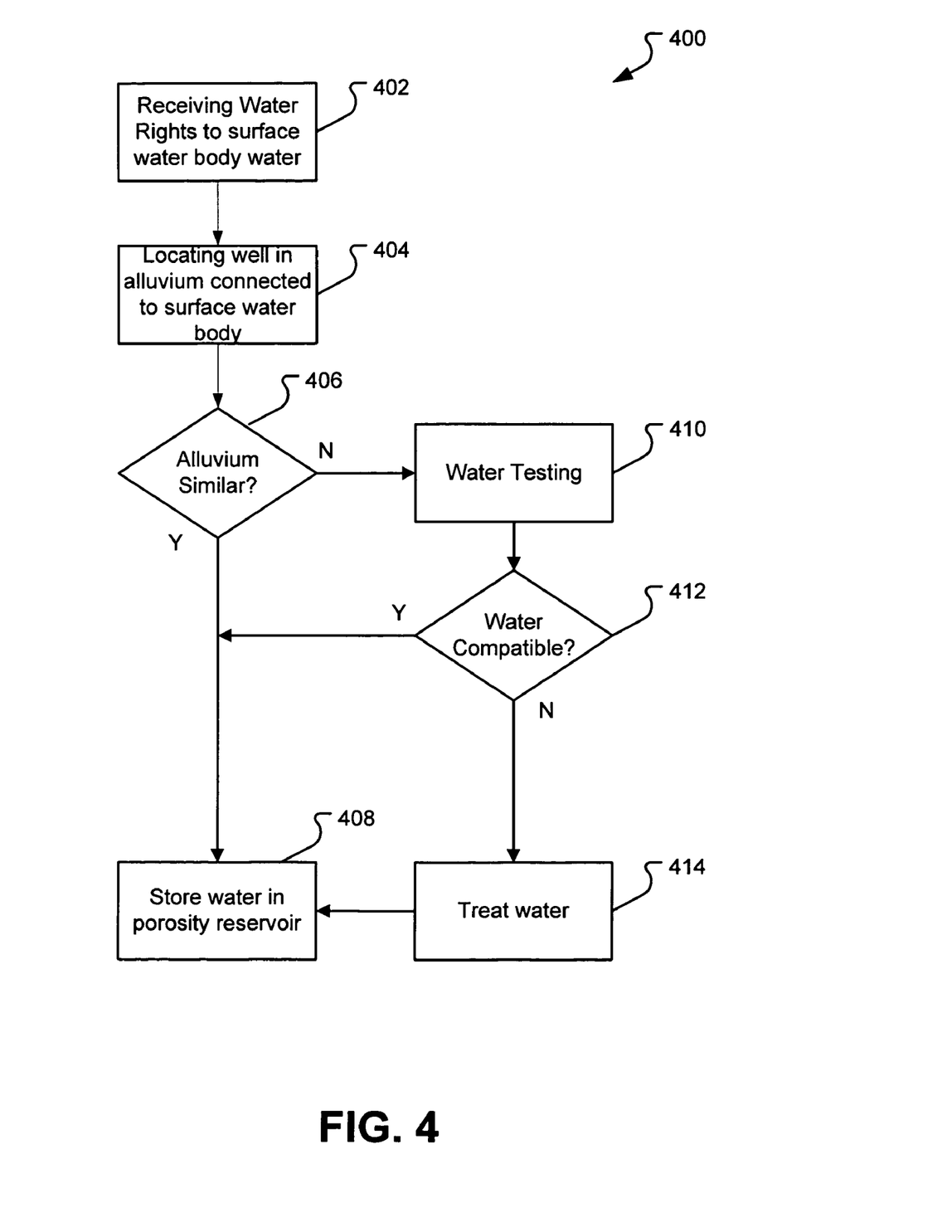
FIG. 4 illustrates an embodiment of a method for extracting water from a surface water body and storing the water in an underground porosity reservoir that reduces the potential for fouling of the reservoir due to sediments in the water to be stored.

FIG. 4 illustrates an embodiment of a method 400 for extracting water from a surface water body system, such as a river system, and storing the water in an underground porosity reservoir that reduces the potential for fouling of the reservoir due to sediments in the water to be stored. The embodiment will be described with reference to the exemplary underground porosity reservoir 32 and transfer system 50 shown in FIGS. 1 and 2, although one skilled in the art will recognize that the method is not limited to any specific embodiment of an underground reservoir system, provided that the reservoir is filled with a naturally porous material (such as sand or gravel).

The method 400 begins with receiving water rights (at step 402) to a quantity of water in a surface body, in this case the river 22, the water to be stored in the underground reservoir 32. These rights may be continuous water rights based on prior beneficial use or may be seasonal or periodic rights based on the current flow in the surface body 22. The method 400 accounts for situations in which the rights obtained are to surface bodies that are not proximate to the underground reservoir (as in the previous method 300) and, therefore, the water at the extraction point can not be assumed to be compatible with the underground reservoir.

After receiving the water rights in receiving operation 402, the water is not simply pumped from the surface body into the underground reservoir 32, which could easily result in fouling of the underground reservoir due to chemical, physical or biological incompatibilities. Instead, a subsurface extraction point 64 in the aquifer 24 is identified as part of "locating" operation 404. A preferred location of the extraction point 64 is one that is within the aquifer 24 and that is recognized by the governing water authority of the surface body 22 as being an equivalent source as the surface body 22 for the extraction of water. That is, as far as the governing water authority is concerned, removing water from the extraction point 64 is considered the same as removing water directly from the surface body 22 even though the water is taken from the aquifer 24, because the two are closely hydrologically connected.

In addition to the regulatory issues of extracting water, the extraction location should be chosen based on the type of alluvium at the point of extraction and the quality of the water obtained from the location. By extracting water from the subsurface alluvium instead of the surface body, the overburden is used as a natural chemical and physical filter for the water. This reduces the amount of treatment necessary to make the water compatible with the material in the underground reservoir 32, as will be discussed in greater detail below.

Multiple extraction locations may be identified in the locating operation 404 in order to achieve a desired water extraction rate. Often, water rights are based on the amount of available water in the surface water body and quantified by a flow rate. For example, one particular water right might allow the right owner to draw 25 gallons per minute from a river system any time that the river system has a flow of 500 gallons per minute or more. The well or wells identified in the locating operation 404 should be monitored to ensure that the maximum flow rate of the water right can be obtained.

In a preferred embodiment, the locating operation 404 is performed once, when the water rights are obtained, and then the well (or wells) is used for subsequent seasonal extractions from the water body. Thus, the same well located in operation 404 may be used for long-term, but periodic extraction, as long as the well can remain in service.

After the extraction point 64 is identified, operation 406 determines if the alluvium at the extraction point 64 is similar to the material in the porosity reservoir 32. This is preferably performed using core samples obtained from drilling test wells in the alluvium or from the locating operation 404 itself. The characteristics of the alluvium material are determined directly from the analysis and comparison of the core samples. In an alternative embodiment, the alluvium testing operation 406 is performed based on previously collected data on the alluvium, such as may be available from previous wells drilled in the area.

The similarity determination is based primarily on whether the alluvium at the extraction point 64 and the material in the underground reservoir 32 are from the same alluvial deposit and/or have similar physical and chemical characteristics such as porosity, mean particulate size and mineral type. In the porosity reservoir embodiment shown in FIGS. 1 and 2, the alluvium in the aquifer 24 and the alluvium in the porosity reservoir 32 would be considered similar, as they are part of the same alluvial deposit. Because they are similar, the water in the aquifer 24 is considered compatible with the material in the porosity reservoir and it is transferred to the porosity reservoir in a storing operation 408.

Alternatively, the alluvium testing operation 406 may determine that the alluvium is not similar to the material in the underground reservoir 32. For example, if the material in the porosity reservoir is not natural alluvium but some imported, porous material (such as imported sand or gravel), the natural alluvium—even though in close proximity to the underground reservoir 32—may not be similar. In a conservative determination, if the extraction point 64 is located within a material that is different from the material in the porosity reservoir 32, it will be considered non-similar and potentially having incompatible water until it has been tested by subsequent operations.

If the material at the extraction point is not a similar material to that in the porosity reservoir 32, a testing operation 410 is performed to test the chemical and physical characteristics of water obtained from the extraction point 64. The water testing operation 410 preferably includes turbidity testing to identify the amount of entrained sediment in the water. Excessive sediment may settle out of the water and plug up the pores of the material in the underground reservoir 32. At best, such sediment would reduce the usable lifetime of the underground reservoir 32 by slowly reducing the effective water storage capacity. At worst, the sediment could quickly foul the injection points to the underground reservoir 32, rendering the underground reservoir effectively useless until new wells are drilled.

In a preferred embodiment, the water testing operation 410 also includes chemical testing to ensure that dissolved chemicals, such as dissolved salts, metals, silicates, and other compounds, will not precipitate out in the environment within the underground reservoir 32. The testing of water for compatibility is well known in the art and typically involves comparing the findings of the chemical tests with the chemistry within the underground reservoir. Such testing may include measuring the following factors: total dissolved solids; pH; amounts of specific elements or compounds such as iron, phosphorous arsenic, cadmium, silica, barium, copper, lead, chloride, sodium, manganese, sulfates, and nitrates; chemical oxygen demand; biological oxygen demand; total dissolved oxygen; and other various chemical aspects of the water.

After the water testing operation 410 has been performed, a determination is made (at step 412) as to whether the water is compatible with the environment in the underground reservoir 32. If the water is compatible, i.e., it is determined that no detrimental effects will occur due to injection and storage of the water in the underground reservoir, then the water is injected and stored in storage operation 408.

If the water is not compatible, then the water is extracted and treated in a treatment operation 414 prior to injection of the water in the storing operation 408. In general, any treatment that renders the water to be stored compatible with the material in the underground reservoir 32 may be used.

The specific type of treatment used will depend on the issue that caused the incompatibility and the economics of the treatment. For example, too much dissolved oxygen in the water to be stored can be corrected by stripping the oxygen prior to injection into the underground reservoir 32. Treatment of water to meet specifications or remove a particular chemical is well known in the art and is beyond the scope of this specification.

Storing operation 408 may involve extracting the water from the extraction point 64 (if not already extracted such as in treatment operation 414), transporting it, and injecting the compatible water into the underground reservoir 32. This may involve the use of one or more pumps or may simply involve allowing water to flow by gravity from the extraction point to the underground reservoir. The water may be injected via a well 52 or may be injected above the water level 40 of the underground reservoir and allowed to infiltrate down to the water level 40 over time. Alternatively, the water to be stored in the underground reservoir may be temporarily stored in an infiltration pond (not shown in FIGS. 1 and 2) and allowed to infiltrate from the pond through the surface to the underground reservoir 32.

Many alternative embodiments of the method 400 are possible. For example, the extraction point locating operation 404 may have occurred in anticipation of the receipt of water rights from a surface body. In that case, the water at the extraction point 64 may have been pre-tested such that the alluvium analysis operation 406, water testing operation 410, and the compatibility determination 412 were completed prior to the actual receipt of rights in the receiving operation 402. This and other alternative embodiments are possible and considered within the scope of the present invention.

Another benefit of embodiments of the present invention is related to the impacts on the natural environment due to discharge of water from a reservoir. Occasionally during the operation of a reservoir, stored water must be discharged into the natural environment, usually to a surface body such as a river. This may occur, for example, in cases where water is stored upstream for use at some downstream location. In this case, when the water needs to be used, the stored water is discharged upstream, and the river is used as the conveyance to the downstream point of use. Water in a surface body will have a temperature that is dictated by the surrounding environment and the current weather and season. Often, aquatic life in a surface body is highly sensitive to temperature changes of only a few degrees. For example, Brook Trout prefer waters with temperatures ranging from 41 to 55° F. (5 to 13° C.) with Rainbow Trout having an even narrower range of 44 to 50° F. (6 to 11° C.). If the water temperature is outside of these preferred ranges, the trout are more susceptible to disease and may be killed outright. In addition, fish are not the only form of aquatic life with such temperature sensitivity, as many species of insects and aquatic plant life have similarly limited preferred temperature ranges. Detrimentally impacting aquatic life by changing the temperature of the surface body may subject the responsible party to fines and other penalties under various laws directed to protecting natural resources. This issue is important when operating an open reservoir because the stored water is often at a substantially different temperature than the surface water body.

However, the water in an underground reservoir 32 naturally achieves over time a temperature similar to that of the natural alluvium surrounding the underground reservoir 32, and embodiments of the present invention are already provided with the means for discharging water from the reservoir 32 into the natural alluvium. In embodiments of the present invention, temperature impacts to the surface body 22 are reduced by discharging stored water to the hydrologically connected aquifer 24 as opposed to directly discharging the water to the body 22. The underground reservoir 32 exists in substantially the same temperature environment as the aquifer 24. If the wells 52, 54 are located at substantially the same depth, then the temperature of the water at the points of injection and extraction should be substantially similar. Furthermore, by keeping all the piping of the system 50 in the subsurface, heat transfer between the above ground environment and the water being transferred is kept to a minimum. Therefore, embodiments of the present invention are uniquely suited for storing water that will need to be discharged to the environment in the future.

Figure 5:
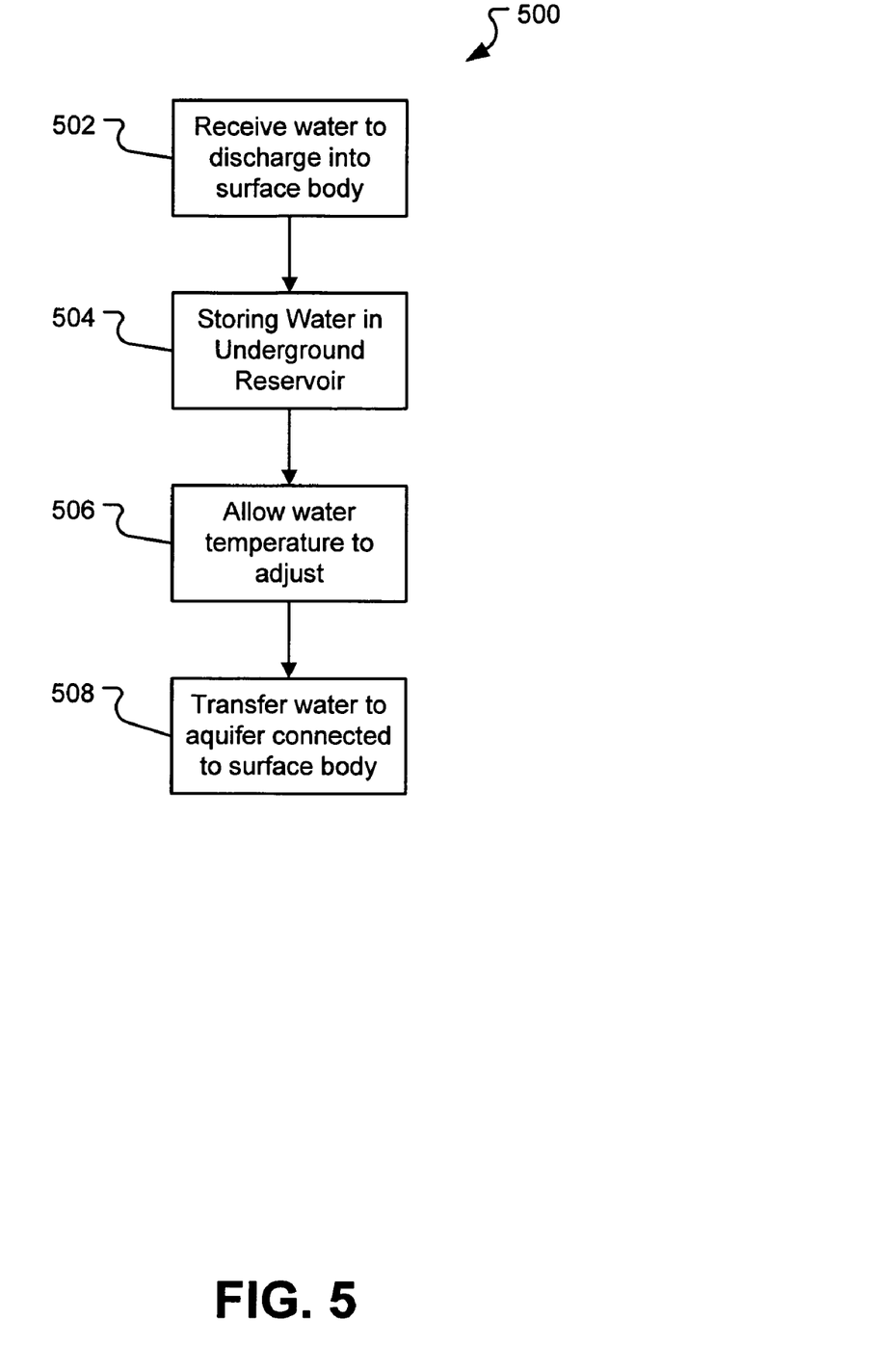
FIG. 5 illustrates an embodiment of a method of using an underground reservoir to reduce the temperature impacts to a surface body, such as a river in FIGS. 1 and 2, caused by the discharge of water to the surface body.

Furthermore, embodiments of the present invention are suitable for use as efficient temperature management systems for the discharge of water to surface bodies. FIG. 5 illustrates an embodiment of a method 500 of using an underground reservoir to reduce the temperature impacts to a surface body, such as a river 22 in FIGS. 1 and 2, caused by the discharge of water to the surface body. In the embodiment, the surface body has a natural temperature (the surface water body temperature) upon which aquatic life depends, and the method reduces the impact to the surface water body temperature so as to protect the aquatic life of the surface body. The embodiment will be described with reference to the exemplary underground reservoir 32 shown in FIGS. 1 and 2, although one skilled in the art will recognize that the method is not limited to any specific embodiment of an underground reservoir.

The method 500 begins with receiving water to be discharged to a surface body in a receiving operation 502. The water may be received from another surface body such as an open surface reservoir or a lake, from a storage vessel such as a water tank or a water tower, or the water may be received directly from the discharge of a factory, a water treatment system, an irrigation system, or some other continuous or intermittent water discharge. The water preferably is received via an underground pipeline to the reservoir. However, the water may also be received by any typical method such as via truck, aboveground pipeline or open ditch.

The received water is then stored in an underground reservoir 32 such as that shown in FIGS. 1 and 2, in a storing operation 504. The storing operation 504 may include pretreating the water before storing it in the underground reservoir as described in FIG. 4 above. In the storing operation 504, if the underground reservoir 32 is a porosity reservoir, the received water is preferably injected either under pressure from a pump or via normal hydrostatic pressure into the underground reservoir to be stored in the pores of the alluvium.

Next, the stored water is stored for a period of time in order to allow the temperature of the received water to be adjusted by the subsurface environment in a temperature adjusting operation 506. The term "adjusting" is used here as depending on the circumstances where the received water may be too warm or too cold for direct discharge to the surface body. Preferably, the received water is stored for a period of time sufficient to bring the water-alluvium system in the underground reservoir to a target discharge temperature, which, in one embodiment, is an equilibrium aquifer temperature. Preferably, the temperature of the received water is adjusted to within a predetermined range based on the temperature at the discharge point 64 within the aquifer 24 as described below. This range is one that will reduce, to an acceptable level, any detrimental impacts to the surface water body due to temperature. The acceptable temperature range is normally dictated by a regulatory body that oversees the water discharge to surface bodies and normally determined based on environmental studies and research performed by government bodies, such as the Environmental Protection Agency.

The time necessary for the temperature adjusting operation 506 is significantly improved by the use of a porosity reservoir. The material, such as natural alluvium, in the underground reservoir 32 has a significant amount of volumetric heat capacity, in that the material can store a large amount of thermal energy by volume. In addition, the existing water stored in the porosity reservoir will also contain a significant amount of thermal energy. Volumetric heat capacity is a function of density and the specific heat of the material. For example, under typical conditions, granite has a heat capacity of approximately 0.8 joules per degree-gram (J/° K·g) and a specific gravity of 2.75, while water has a heat capacity of approximately 4.2 J/° K·g and a specific gravity of 1. Therefore, a reduction in temperature of 1 degree Celsius of a liter of granite provides an amount of energy required to increase the temperature of one liter of water 0.65 degrees Celsius. In addition, there is typically much more volume of material in a porosity reservoir than volume of stored water. Therefore, in a porosity reservoir the temperature of a substantial amount of water can be changed much more quickly as compared to adding a similar amount of water to an open storage reservoir. Additionally, as the material is also in equilibrium with the temperature of the aquifer, a porosity reservoir is well suited to passively adjusting the temperature of water to that of the surrounding aquifer 24.

The duration of the temperature adjusting operation 506 is preferably determined by direct temperature measurement from the extraction well 54 in the underground reservoir 32. Alternatively, the duration is an estimated time period based on calculations or empirical findings. The duration may also be a function of the target discharge temperature range. Preferably, the target discharge temperature range will be within 5 degrees Celsius of that of the current aquifer at the point(s) of injection. More preferably, the discharge temperature range will be with 2.5 degrees C., and most preferably the discharge temperature will be within 1 degree C. of the current aquifer temperature. This target discharge temperature range is preferably based on a directly measured temperature at the discharge point in the aquifer. In alternative embodiments, measurements taken at other locations, such as the surface body, are used as indirect measurements of the aquifer temperature and modified to obtain an acceptable discharge temperature range.

In one embodiment the temperature adjusting operation 506 is considered complete when the water at the extraction point (or points in a multi-well system) in the underground reservoir is within the target discharge temperature range. Once complete, the stored water—now having a temperature within the discharge temperature range—is transferred to the aquifer 24 in a transfer operation 508.

In order to accurately determine the water temperatures at various points in the system, temperature monitoring is done at various locations. For example, a thermometer, or some equivalent temperature monitoring device, is provided either at the discharge point 64 or at some other location in the transfer system 50 where accurate temperature readings indicative of the temperature at the discharge point 64 can be obtained. Similarly, temperature monitoring devices are preferably provided for monitoring the temperature within the reservoir and at other points in the transfer system 50. For example, probes may be located within the wells and also at various locations and depths in the alluvium around the wells.

In the embodiment shown, after the adjusting operation 506, the water in the reservoir is discharged into the aquifer in a transfer operation 508. The water is preferably discharged at the discharge point 64 that was used to determine the temperature compatibility. Because this involves a discharge of water (rather than the extraction of water), there is no preference regarding the location of the discharge point with respect to the aquiclude depth (as there is with the extraction methods of FIGS. 3 and 4). Any discharge location within the aquifer is suitable, as the only requisite is to transfer the water into the aquifer.

The process described with reference to FIG. 5 can be considered a batch temperature adjustment method. An alternative embodiment of a continuous or simultaneous temperature adjustment method is also possible. In one alternative embodiment, the underground reservoir is used as more of a non-steady state, flow-through temperature adjustment system rather than a batch system. Specifically, in the alternative embodiment, the receiving operation 502 preferably receives the water at some point above the water level 40 within the underground reservoir 32. Substantially simultaneously, water from an extraction point 62 below the reservoir's water level 40 (and already having a temperature substantially equal to that at the discharge point 64) is extracted from the reservoir 32 and injected at the discharge point 64 in the aquifer 24 in the transfer operation 508. The transfer continues until a quantity of water equal to the total quantity of received water has been discharged, until the extraction point 62 runs dry (as occurs if the water extraction rate is greater than the water recharge rate in the storing operation), or until the temperature of the water extracted from the underground reservoir 32 is no longer within an acceptable range of deviation from the temperature at the discharge point 64. In this non-steady state embodiment, it is assumed that the rate of water transfer through the reservoir is greater than the heat transfer between the reservoir and the surrounding environment can handle. Therefore, the reservoir can only be operated in this non-steady mode for a limited period of time.

Provided that the heat transfer characteristics of the underground reservoir 32 are appropriate, it is also possible to operate the reservoir as a steady-state, continuous heat exchanger that adjusts the temperature of the received water to the discharge point temperature, such that the flow rate of the received water matches that of the flowrate of the discharged water. In those cases where the heat transfer characteristics are not sufficient, the underground reservoir 32 may be operated in this manner until the temperature of the water extracted from the underground reservoir 32 is no longer within an acceptable range of deviation from the temperature at the discharge point 64, at which point the transfer operation 508 may be ceased so that the temperature adjustment operation 506 may continue as described above.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, in order to avoid the confined space regulations associated with underground vaults, such vaults may be replaced by a surface building or, as shown in the alternate embodiment of FIG. 6, by a building 70 located in an excavated area 72 such that the building 70 is below ground surface 44, thereby minimizing at least the aesthetic impacts of the transfer system from the point of view of surface users. Additionally, a variety of piping and well configurations may be used to connect the underground reservoir 32 and the aquifer 24.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A subsurface water storage system for receiving and storing substantially sediment-free water from a surface water body containing sediment-laden water, the subsurface water storage system comprising:

an underground porosity storage reservoir storing water, the underground porosity storage reservoir including an underground vessel formed by one or more substantially water-impermeable, man-made barriers and an aquiclude, the vessel defining a volume such that the volume is substantially hydrologically separate from an environment exterior to the volume;

at least one aquifer well coupled to the underground reservoir by piping, the at least one aquifer well being located in an aquifer that is hydrologically connected to the surface water body, each well having a wellhead; and a pump pumping water from the aquifer into the underground reservoir via the at least one aquifer well when water from the surface water body is available to be stored, the water substantially free of sediments found in the surface water body.

2. The water storage system of claim 1 wherein the at least one aquifer well and wellhead, the underground reservoir, the piping and the pump are underground, the water storage system further comprising:
one or more surface access points for accessing the wellhead of the at least one aquifer well, the pump or the piping, wherein the one or more surface access points are the only visible surface features of the water storage system.

3. The water storage system of claim 2 further comprising:
at least one reservoir well coupled to the pump by piping, the at least one reservoir well being located in the underground porosity storage reservoir, each reservoir well having a wellhead; and
wherein the pump is further capable of pumping water from the underground porosity reservoir into the aquifer via the at least one reservoir well and the at least one aquifer well.

4. The water storage system of claim 3 further comprising:
at least one subsurface vault accessible by one of the one or more surface access points, the subsurface vault housing the wellheads of the at least one aquifer well and the at least one reservoir well.

5. The water storage system of claim 4 wherein the at least one aquifer well includes a first plurality of wells in the aquifer and the at least one reservoir well includes a second plurality of wells in the underground porosity storage reservoir and wherein each of the wellheads of the wells are housed in one or more subsurface vaults accessible by the access points.

6. The water storage system of claim 2 wherein the access points include a below grade building housing and providing access to the wellhead.

7. The water storage system of claim 1 wherein the barriers are slurry walls keyed into the aquiclude.

8. The water storage system of claim 1, wherein the water in the underground porosity storage reservoir has a first temperature and the surface water body has a second temperature, the first temperature being different from the second temperature, and wherein the aquifer has a temperature substantially the same as the first temperature.

9. The water storage system of claim 1, wherein the water in the underground porosity storage reservoir has a first temperature and the surface water body has a second temperature, the first temperature being different from the second temperature, and wherein the aquifer has a temperature within 5 degrees Celsius of the first temperature.

10. The water storage system of claim 1, wherein the water in the aquifer is chemically compatible with the material in the underground porosity storage reservoir.

11. The water storage system of claim 10, wherein the aquifer is located in a natural alluvium of a river system external to the underground porosity storage reservoir.

12. The water storage system of claim 10, wherein the porous material in the underground porosity storage reservoir is a natural alluvium of a river system.

13. The water storage system of claim 1, further comprising:
at least one reservoir well coupled to the pump by piping, the at least one reservoir well being located in the underground porosity storage reservoir, each reservoir well having a wellhead; and
wherein the pump is further capable of pumping water from the underground porosity reservoir into the aquifer via the at least one reservoir well and the at least one aquifer well.

14. The water storage system of claim 1 wherein the at least one aquifer well and wellhead, the underground reservoir, the piping and the pump are positioned substantially underground to reduce any above-ground visual impact of the water storage system.

15. A subsurface water storage system for receiving and storing substantially sediment-free water from a surface water body containing sediment-laden water, the subsurface water storage system comprising:
an underground porosity storage reservoir storing water, the underground porosity storage reservoir including an underground vessel formed by one or more substantially water-impermeable, man-made barriers and an aquiclude, the vessel defining a volume such that the volume is substantially hydrologically separate from an environment exterior to the volume;
a reservoir well located in the underground porosity storage reservoir;
an aquifer well located in an aquifer that is hydrologically connected to the surface water body; and
a pump for transferring water from the aquifer well to the reservoir well when water from the surface water body is available to be stored, wherein the water transferred from the aquifer is substantially free of sediments found in the surface water body.

16. The water storage system of claim 15, wherein the pump is further capable of transferring water from the reservoir well to the aquifer well.

17. The water storage system of claim 15, wherein each of the reservoir well and the aquifer well include a wellhead contained in a subsurface vault.

18. The water storage system of claim 17 wherein the subsurface vault includes a surface access point for accessing the wellheads, and wherein the surface access point is the only visible surface feature of the water storage system.

19. The water storage system of claim 15 wherein:
the water in the underground porosity storage reservoir has a first temperature; and
the water transferred from the aquifer well to the reservoir well has a second temperature that is within 5 degrees Celsius of the first temperature.

* * * * *

US007192218C1

(12) EX PARTE REEXAMINATION CERTIFICATE (8266th)
United States Patent
Peters et al.

(10) Number: US 7,192,218 C1
(45) Certificate Issued: May 24, 2011

(54) DIRECT RECHARGE INJECTION OF UNDERGROUND WATER RESERVOIRS

(76) Inventors: Stanley R. Peters, Castle Rock, CO (US); Donald O. Summers, Morrison, CO (US)

Reexamination Request:
No. 90/009,712, Mar. 31, 2010

Reexamination Certificate for:
| Patent No.: | 7,192,218 |
| Issued: | Mar. 20, 2007 |
| Appl. No.: | 11/064,548 |
| Filed: | Feb. 23, 2005 |

Related U.S. Application Data

(60) Provisional application No. 60/547,496, filed on Feb. 24, 2004.

(51) Int. Cl.
*B65G 5/00* (2006.01)

(52) U.S. Cl. ......................... 405/53; 137/236.1
(58) Field of Classification Search ................ None
See application file for complete search history.

(56) References Cited

U.S. PATENT DOCUMENTS

| 4,326,818 A | 4/1982 | Willis |
| 6,840,710 B2 | 1/2005 | Peters et al. |
| 2002/0172559 A1 | 11/2002 | Peters et al. |

OTHER PUBLICATIONS

Cecil Cross, EPA/540/s–92/008 "Engineering Bulletin Slurry Walls", United States Environmental Protection Agency, Oct. 1992.*
R. Sheets, R. Darby, B. Whitteberry, "Lag times of bank filtration at a well field, Cincinnati, Ohio, USA," Journal of Hydrology, 266 (2002), pp. 162–174.
C. Ray, G. Melin and R. Linsky, "Riverbank Filtration—Improving Source–Water Quality," Water Science and Technology Library, vol. 43, © 2002 Kluwer Academic Publishers.
K. Hiscock, T. Grischek, "Attenuation of groundwater pollution by bank filtration," Journal of Hydrology, 266 (2002), pp. 139–144.
EPA/816–R–99–014u, "Aquifer Recharge and Aquifer Storage and Recovery Wells," Sep. 1999.

* cited by examiner

*Primary Examiner*—William C Doerrler (57) ABSTRACT

An underground porosity water storage reservoir minimizes the impacts on surface uses of the reservoir site. Furthermore, a method of operating an underground porosity storage reservoir minimizes damage to the reservoir due to injecting sediment-laden water or water that is chemically incompatible with the porous material in the underground reservoir. The underground porosity water storage reservoir reduces temperature impacts on surface waters due to the discharge of stored water. A method of using the porosity storage reservoir to minimize adverse temperature impacts when discharging water to a surface body is disclosed.

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1,10, 12 and 15 are determined to be patentable as amended.

Claims 2-9, 11, 13, 14 and 16-19, dependent on an amended claim, are determined to be patentable.

New claims 20-25 are added and determined to be patentable.

1. A subsurface water storage system for receiving and storing substantially sediment-free water from a surface water body containing sediment-laden water, the subsurface water storage system comprising:
   an underground porosity storage reservoir storing water, the underground porosity storage reservoir including an underground vessel formed *at a first location* by one or more substantially water-impermeable, man-made barriers and an aquiclude, the vessel defining a volume *of porous alluvial materials having specific physical and chemical characteristics* such that the volume is substantially hydrologically separate from an environment exterior to the volume;
   at least one aquifer well coupled to the underground reservoir by piping *and having a wellhead*, the at least one aquifer well [being] located *at a second location* in an aquifer that is hydrologically connected to the surface water body, [each well having a wellhead] *wherein aquifer water at the second location is compatible with at least one of the specific physical or chemical characteristics of the porous alluvial materials within the underground porosity storage reservoir at the first location;* and
   a pump pumping water from the aquifer into the underground reservoir via the at least one aquifer well when water from the surface water body is available to be stored, the *pumped* water substantially free of sediments found in the surface water body.

10. The water storage system of claim 1, wherein the [water in the aquifer is chemically compatible with the material in the underground porosity storage reservoir] *second location is based on a comparison of a chemical characteristic of the aquifer water at the second location and a specific chemical characteristic of the porous alluvial materials within the underground porosity storage reservoir at the first location*.

12. The water storage system of claim 10, wherein the porous *alluvial* [material]*materials* in the underground porosity storage reservoir [is] *are* a natural alluvium of a river system.

15. A subsurface water storage system for receiving and storing substantially sediment-free water from a surface water body containing sediment-laden water, the subsurface water storage system comprising:
   an undergound porosity storage reservoir storing water, the underground porosity storage reservoir including an underground vessel formed *at a first location* by one or more substantially water-impermeable, man-made barriers and an aquiclude, the vessel defining a volume *of porous alluvial materials having specific physical and chemical characteristics* such that the volume is substantially hydrologically separate from an environment exterior to the volume;
   a reservoir well located in the underground porosity storage reservoir;
   an aquifer well located *at a second location* in an aquifer that is hydrologically connected to the surface water body, *wherein aquifer water at the second location is compatible with at least one of the specific physical or chemical characteristics of the porous alluvial materials within the underground porosity storage reservoir at the first location;* and
   a pump for transferring water from the aquifer well to the reservoir well when water from the surface water body is available to be stored, wherein the water transferred from the aquifer is substantially free of sediments found in the surface water body.

20. *The water storage system of claim 15 wherein the second location is based on a comparison of a chemical characteristic of the aquifer water at the second location and a specific chemical characteristic of the porous alluvial materials within the underground porosity storage reservoir at the first location.*

21. *The water storage system of claim 15 wherein the specific physical characteristics include one or more of temperature, porosity, mean particulate size and mineral type.*

22. *The water storage system of claim 15 wherein the specific chemical characteristics include one or more of measured pH or amounts of entrained sediments, total dissolved solids, iron, phosphorous arsenic, cadmium, silica, barium, copper, lead, chloride, sodium, manganese, sulfate, calcium carbonate, nitrate, chemical oxygen demand, biological oxygen demand, or total dissolved oxygen.*

23. *The water storage system of claim 1, wherein the specific physical characteristics include one or more of temperature, porosity, mean particulate size and mineral type.*

24. *The water storage system of claim 1, wherein the specific chemical characteristics include one or more of measured pH or amounts of entrained sediments, total dissolved solids, iron, phosphorous arsenic, cadmium, silica, barium, copper, lead, chloride, sodium, manganese, sulfate, calcium carbonate, nitrate, chemical oxygen demand, biological oxygen demand, or total dissolved oxygen.*

25. *The water storage system of claim 1, wherein the specific physical and chemical characteristics of the porous alluvial materials are determined based on at least one of a core sample of the porous alluvial materials at the first location and a water sample obtained from the porous alluvial materials at the first location.*

* * * * *